US012570498B2

(12) United States Patent
Zhu et al.

(10) Patent No.: US 12,570,498 B2
(45) Date of Patent: Mar. 10, 2026

(54) BRAKE STATIC PLATE ASSEMBLY, BRAKE AND ELEVATOR SYSTEM

(71) Applicant: Otis Elevator Company, Farmington, CT (US)

(72) Inventors: Fengkun Zhu, Tianjin (CN); Linlin Luo, Tianjin (CN); Xuewei Wang, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 959 days.

(21) Appl. No.: 17/825,712

(22) Filed: May 26, 2022

(65) Prior Publication Data

US 2023/0009007 A1 Jan. 12, 2023

(30) Foreign Application Priority Data

Jul. 9, 2021 (CN) ........................ 202110777177.2

(51) Int. Cl.
*B66B 1/32* (2006.01)
*B66B 5/18* (2006.01)

(52) U.S. Cl.
CPC . *B66B 1/32* (2013.01); *B66B 5/18* (2013.01)

(58) Field of Classification Search
CPC .................................... B66B 1/32; B66B 5/18
USPC ........................................................ 187/288
See application file for complete search history.

(56) References Cited

U.S. PATENT DOCUMENTS 5,443,132 A * 8/1995 Arnold .................. B60T 13/741 188/164
7,318,515 B2 * 1/2008 Hornbrook ............. F16D 67/06 192/222
9,438,084 B2 * 9/2016 Paone .................. H02K 7/1025

FOREIGN PATENT DOCUMENTS

JP 2004129396 A * 4/2004
JP 3967569 B2 * 8/2007

* cited by examiner

*Primary Examiner* — Jianchun Qin
(74) *Attorney, Agent, or Firm* — CANTOR COLBURN LLP

(57) ABSTRACT

A brake static plate assembly, a brake and an elevator system. The brake static plate assembly includes a first static plate and a second static plate. The first static plate includes a first outer edge and a second outer edge which are adjacent to each other; a first inner edge provided with a first shaft mounting notch thereon; a first set of coils disposed on a braking surface of the first static plate. The second static plate includes: a third outer edge and a fourth outer edge which are adjacent to each other; the second inner edge which is matched with the first inner edge and is provided with a second shaft mounting notch which forms a shaft mounting hole of the drive shaft together with the first shaft mounting notch; the second set of coils are disposed on the braking surface of the second static plate.

17 Claims, 4 Drawing Sheets

BRAKE STATIC PLATE ASSEMBLY, BRAKE AND ELEVATOR SYSTEM

FOREIGN PRIORITY

This application claims priority to Chinese Patent Application No. 202110777177.2 filed Jul. 9, 2021, and all the benefits accruing therefrom under 35 U.S.C. § 119, the contents of which in its entirety are herein incorporated by reference.

TECHNICAL FIELD

The present application relates to the field of elevators, and more particularly, the present application relates to a brake for an elevator system and a brake static plate assembly therein.

BACKGROUND

Passenger transport devices are very common in everyday life as tools to improve the walking of passengers between floors or to shorten the distance traveled by passengers. By way of example, escalators and elevators which are commonly used between floors of commercial buildings as well as moving walkways which are commonly used in large airports are especially common.

For an elevator system, it has an elevator car that normally runs in a dedicated hoistway. The elevator car performs a lifting motion along the hoistway under the traction of the traction machine device. However, in this process, if an unexpected situation occurs, safety issues such as elevator car falling may result. Therefore, in order to ensure the safety of the elevator, the national standard in the industry stipulates that the elevator system must be provided with the elevator brake, and in order to ensure that the brake has a spare measure, the latest national standard also requires that the brake driven by the electromagnetic force is provided with at least two sets of electromechanical brake devices (all brake mechanical parts (including electromagnet movable and static iron cores and components for guiding the movable iron cores) involved in applying braking force to a braking wheel (disc) shall be provided in at least two sets, and for passenger elevators and freight elevators, the electromechanical brake is used, and the electromagnetic coils shall be provided in at least two sets). Under this condition, the brake is expected to be improved in order to meet the national standard, meanwhile, the original design space is continuously used as much as possible in a compact elevator structure, and the modification of other components and parts of a formed elevator system is reduced as much as possible.

SUMMARY

The present application intends to provide a brake static plate assembly, a brake and an elevator system to solve or at least mitigate some of the aforementioned technical problems.

In order to achieve at least one of the objects of the present application, according to an aspect of the present application, there is provided a brake static plate assembly comprising a first static plate and a second static plate. The first static plate has: a first outer edge and a second outer edge which are adjacent to each other; a first inner edge provided with a first shaft mounting notch thereon; and a first set of coils disposed on a braking surface of the first static plate.

The second static plate has: a third outer edge and a fourth outer edge which are adjacent to each other; a second inner edge which is matched with the first inner edge and is provided with a second shaft mounting notch which forms a shaft mounting hole of a drive shaft together with the first shaft mounting notch; a second set of coils disposed on the braking surface of the second static plate, and the magnetic flux of the second set of coils is the same as that of the first set of coils. Therein, the first inner edge forms an acute angle to the first outer edge and/or the second outer edge, and the second inner edge forms an acute angle to the third outer edge and/or the fourth outer edge.

In addition to one or more of the features described above, or as an alternative, in a further embodiment, the first outer edge and second outer edge are perpendicular to each other, the first inner edge forms an angle of 45° angle with the first and second outer edges respectively; the third outer edge and the fourth outer edge are perpendicular to each other, and the second inner edge forms an angle of 45° with the third outer edge and the fourth outer edge respectively.

In addition to one or more of the features described above, or as an alternative, in a further embodiment, an area of the braking surfaces of the first and second static plates is greater than an area of a largest circle formed in a boundary defined by the first outer edge, the second outer edge, the third outer edge and the fourth outer edge.

In addition to one or more of the features described above, or as an alternative, in a further embodiment, the first static plate is disposed symmetrically to the second static plate.

In addition to one or more of the features described above, or as an alternative, in a further embodiment, the brake static plate assembly further includes a first mounting edge and a second mounting edge. The first mounting edge is connected between the first inner edge and the first and/or second outer edges, and the second mounting edge is connected between the second inner edge and the third and/or the fourth outer edges. Therein, a brake switch used for controlling on-off of the power supply of the first set of coils and/or the second set of coils is disposed in a plane where the first static plate and the second static plate are located along the first mounting edge and the second mounting edge.

In addition to one or more of the features described above, or as an alternative, in a further embodiment, a reset part is further disposed on the braking surface of the first static plate and/or the braking surface of the second static plate and used for providing reset force for brake operation or release operation of a braking part of the brake; the first set of coils of the first static plate and the second set of coils of the second static plate provide electromagnetic force for release operation or brake operation of a braking part of the brake; wherein the electromagnetic force and the reset force have opposite force application directions.

In addition to one or more of the features described above, or as an alternative, in a further embodiment, the reset part is provided close to the edge of the first static plate and/or the edge of the second static plate.

In addition to one or more of the features described above, or as an alternative, in a further embodiment, a guide part is further provided on the braking surface of the first static plate and/or the braking surface of the second static plate, and the guide part used for the brake operation of guiding the braking part of the brake to move away from the brake static plate assembly and/or the release operation of guiding the braking part of the brake to move towards the brake static plate assembly.

In addition to one or more of the features described above, or as an alternative, in a further embodiment, the guide part is disposed close to the edge of the first static plate and/or the edge of the second static plate.

In addition to one or more of the features described above, or as an alternative, in a further embodiment, a guide post and a reset spring surrounding the guide post are further disposed on the braking surface of the first static plate and/or the braking surface of the second static plate; wherein the reset force provided by the reset spring is used for the brake operation of guiding the braking part of the brake to move along the guide post and away from the brake static plate assembly and/or the release operation of guiding the braking part of the brake to move towards the brake static plate assembly; and the electromagnetic force provided by the first set of coils of the first static plate and the second set of coils of the second static plate is used for the brake operation of guiding the braking part of the brake to move along the guide post and away from the brake static plate assembly and/or the release operation of guiding the braking part of the brake to move towards the brake static plate assembly; wherein the electromagnetic force and the reset force have opposite force application directions.

In addition to one or more of the features described above, or as an alternative, in a further embodiment, the first set of coils is configured as one arc-shaped coil or racetrack-shaped coil, or as a plurality of arc-shaped coils, racetrack-shaped coils, or circular coils; or the second set of coils is configured as one arc-shaped coil or racetrack-shaped coil, or as a plurality of arc-shaped coils, racetrack-shaped coils, or circular coils.

To achieve at least one of the objects of the present application, according to another aspect of the present application, there is provided a brake static plate assembly comprising: a brake static plate assembly as previously described; and the braking part which is driven to move towards the brake static plate assembly to perform the release operation or move away from the brake static plate assembly to perform the brake operation.

In addition to one or more of the features described above, or as an alternative, in a further embodiment, the brake static plate assembly further comprising a transmission part, which comprises a brake lining disc fixedly connected to the drive shaft.

In addition to one or more of the features described above, or as an alternative, in a further embodiment, when the brake static plate assembly includes a guide post, the braking part further includes a guide bushing disposed through its main body for fitting with the guide post of the brake static plate assembly.

In order to achieve at least one of the objects of the present application, according to yet another aspect of the present application, there is provided an elevator system comprising: a brake as previously described; and a motor assembly having a transmission part associated to the drive shaft; wherein a braking part of the brake is driven to move towards the brake static plate assembly to perform the release operation or move towards the transmission part to perform the brake operation.

According to the present application, through the arrangement that the first static plate and the second static plate are matched with each other, the brake static plate assembly and the brake meets the mandatory requirements of the national standard: all brake mechanical parts (including electromagnet movable and static iron cores and components for guiding the movable iron cores) involved in applying braking force to a brake wheel (disc) shall be provided in at least two sets. For passenger elevators and freight elevators, electromechanical brakes are used and electromagnet coils shall be provided in two sets. Meanwhile, due to the design mode that the inner edge and the outer edge form an acute angle, the first static plate and the second static plate are generally provided in an inclined matching mode. Compared with a right-facing matching mode, the current design can provide larger coil arrangement space, thus more magnetic flux and electromagnetic force are generated under the same area of the static plate, and on the premise that other components and parts of the formed elevator system are hardly changed, the braking performance and reliability of the elevator are improved.

DETAILED DESCRIPTION

The present application will be described in detail below with reference to exemplary embodiments in the accompanying drawings. It should be appreciated, however, that the present application may be implemented in various different forms and should not be construed as being limited to the embodiments set forth herein. These embodiments are provided herein so that the disclosure of this application will be complete and similar, and will fully convey the concept of the present application to those skilled in the art.

Furthermore, for any single technical feature described or implicit in the embodiments referred to herein, or shown or implicit in the various drawings, the present application still allows any combination or deletion between these technical features (or their equivalents) to proceed without any technical obstacle, thereby obtaining still other embodiments of the present application which may not be directly mentioned herein.

Figure 1:
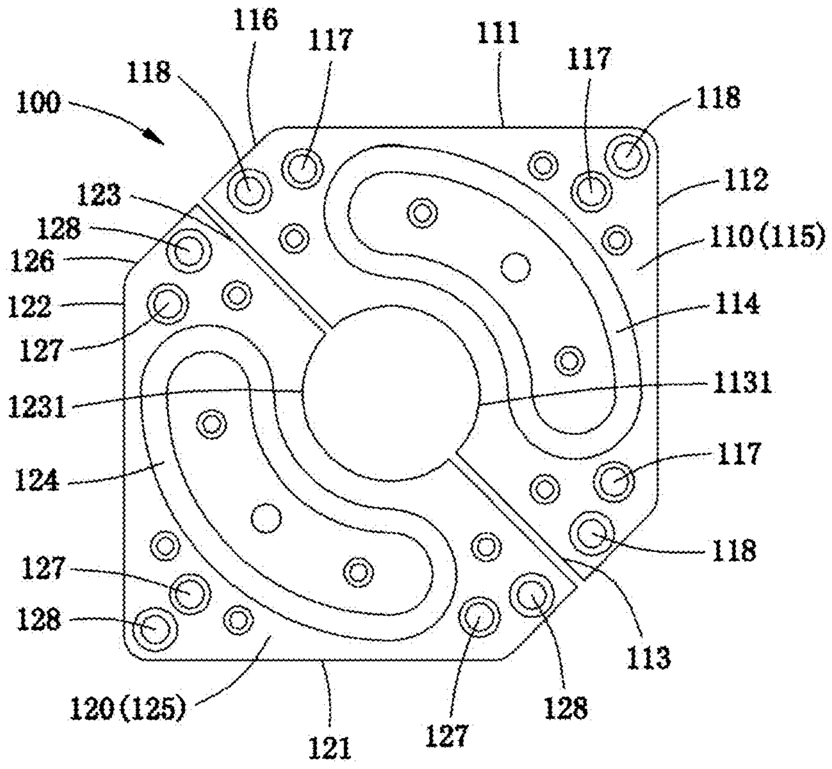
FIG. 1 is a schematic view of one embodiment of a brake static plate assembly for an elevator system.
Figure 2:
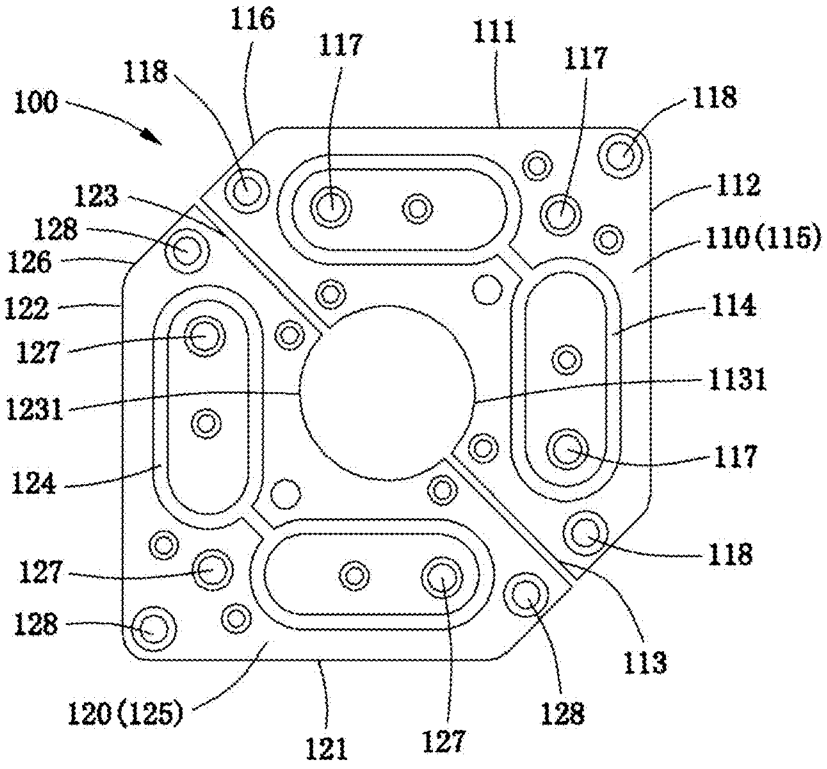
FIG. 2 is a schematic view of another embodiment of a brake static plate assembly for an elevator system.
Figure 3:
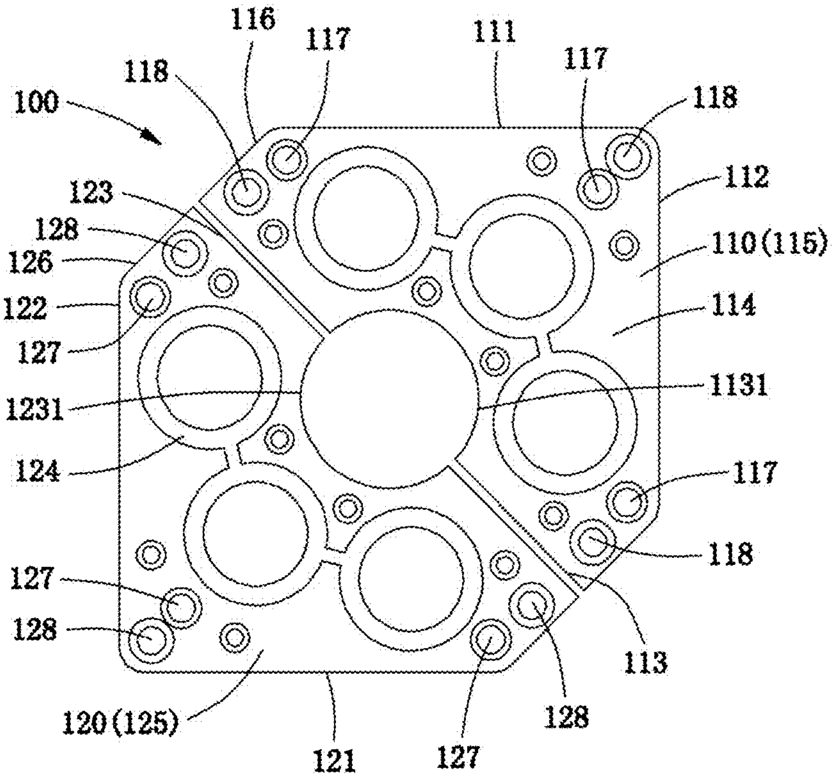
FIG. 3 is a schematic view of yet another embodiment of a brake static plate assembly for an elevator system.

The present application exemplarily describes a brake static plate assembly, a brake for an elevator system, and an arrangement thereof associated with an elevator system in connection with FIGS. 1-7. Therein, FIGS. 1-3 illustrate a number of embodiments of a brake static plate assembly. FIGS. 4-7 show different assembled states and different perspectives of the brake. The description will be developed as follows.

FIG. 1 is first used as an example to describe general parts of various embodiments of the brake static plate assemblies described herein, and then the features of each of the brake static plate assemblies are described in conjunction with different figures.

Referring to FIG. 1, the brake static plate assembly 100 includes a first static plate 110 and a second static plate 120 disposed opposite to each other along a inclined angle. Due to the design of dividing into two parts, the mandatory requirements of national standards are met. Specifically, the first static plate 110 is provided with a first outer edge 111 and a second outer edge 112 which are adjacent to each other on a side remote from the second static plate 120, and is provided with a first inner edge 113 on a side engaging with the second static plate 120, and the first inner edge 113 is provided with a first shaft mounting notch 1131. Correspondingly, the second static plate 120 is provided with a third outer edge 121 and a fourth outer edge 122 which are adjacent to each other on a side remote from the first static plate 110, and is provided with a second inner edge 123 on a side engaging with the first static plate 110, and the second inner edge 123 is provided with a second shaft mounting notch 1231, which forms a shaft mounting hole of the drive shaft 211 together with the first shaft mounting notch 1131.

Continuing to refer to FIG. 1, the brake static plate assembly is present as a reference for movement of a braking part of the brake and is also used to provide the braking part with an electromagnetic force that drives its movement. Therefore, a corresponding electromagnetic coil is further disposed on each static plate. For example, as illustrated, the first set of coils 114 is disposed on the braking surface 115 of the first static plate 110 and the second set of coils 124 is disposed on the braking surface 125 of the second static plate 120. Therein, the two sets of coils are disposed to meet the safety requirements of the brake in the national standard in the industry. The two sets of coils can work at the same time to provide a larger amount of electromagnetic force and can also serve as safety backups for each other. When one set of coils breaks down, regular work of the brake can still be kept due to the existence of the other set of coils. Therefore, to meet this requirement, it is desirable for both sets of coils to have the same windings and to be able to provide the same magnetic flux.

Furthermore, in view of the relatively compact structure of the elevator system, the reserved design space is relatively limited. Therefore, new designs are expected to follow the original design space as much as possible, as well as to reduce modifications to other components and parts of the formed elevator system. Considering that the static plate assembly of the brake is roughly of a plate-shaped construction, while the occupied space in the thickness direction is relatively small, it is emphatically expected that the static plate assembly can be designed in the original space occupied by the plate-shaped construction, i.e., limiting the length or the width of the static plate assembly within the original range. At this time, adjustment of the structural forms of the first static plate and the second static plate may be considered. In particular, the first inner edge 113 may be made to form an acute angle with the first outer edge 111 and the second outer edge 112, and the second inner edge 123 may be made to form an acute angle with the third outer edge 121 and the fourth outer edge 122. According to the matching mode of static plates under this arrangement, the first static plate and the second static plate are roughly embodied in an inclined matching mode. Compared with a right-facing matching mode, the current design can provide larger space for coil arrangement, so that more magnetic flux and electromagnetic force are generated under the same area of the static plate. Therefore, on the premise that other components and parts of the formed elevator system are hardly changed, the braking performance and reliability of the elevator are improved.

The construction of the various components and parts of the brake static plate assembly and their connection relationships will continue to be described as follows. In addition, some components and parts may be further added, as also exemplarily described below, for the purpose of improving the reliability, utility, economy, or improvements in other aspects.

For example, as a design example of a specific structural profile of a brake static plate assembly, the first outer edge 111 of the first static plate 110 in FIG. 1 is perpendicular to the second outer edge 112 thereof. Of course, the perpendicular relationship as referred to herein includes a situation in which the two outer edges are in linear abutment or adopt arc transition abutment, wherein for a situation in which the two outer edges are in linear abutment, the two outer edges are perpendicular to each other means that the included angle between the two edges is 90°; and for a situation in which the two outer edges adopt arc transition, the two outer edges are perpendicular to each other means that the included angle between the linear extension lines of the two outer edges is 90°. Furthermore, the first inner edge 113 of the first static plate 110 in FIG. 1 forms an angle of 45° to the first outer edge 111 and the second outer edge 112, respectively, i.e. a specific angle is exemplified for the acute angle there between. The angle causes the overall structure of the first static plate tends to be symmetrical, or in the case of what is shown in FIG. 1, to be bilateral symmetrical about its diagonal (upper left part and lower right part). Compared with a design mode of circular symmetrical arrangement or rectangular bilateral symmetrical arrangement, the symmetrical arrangement about the diagonal enables a larger available space for winding when the coil is arranged on the static plate. Under an ideal condition, the amount of the winding and the corresponding magnetic flux which are 1.41 times of those of other arrangement modes can even be achieved. In other words, under the condition that extra design area and design space are not occupied, larger braking force is provided. Similarly, the third outer edge 121, the fourth outer edge 122 and the second inner edge 123 of the second static plate 120 are similarly disposed, and corresponding technical effects can be brought about likewise, which will not be described in detail herein.

Based on the above arrangement mode, an optional example is that, the first static plate 110 and the second static plate 120 are symmetrically disposed, so that they can share the same production mold and a production line, thereby the cost is reduced and the efficiency is improved.

As another example, for a type of brake commonly used at present, a circular static plate structure is generally adopted. Specifically, in order to meet the design requirements of two static plates and two sets of coils, the two static plates can be designed to be two full-circle static plates arranged in the axial direction or two semi-circle static plates segmented in the radial direction. However, according to the concept of the present application, such a circular static plate solution is not used, while a polygonal (quadrangular and above) static plate solution with a plurality of edges is adopted. At this time, in consideration of the problem of the original design space, the sum of the areas of the braking surface 115 of the first static plate 110 and the braking surface 125 of the second static plate 120 may be set to be larger than the area of the largest circle formed in the boundary defined by the first outer edge 111, the second outer edge 112, the third outer edge 121, and the fourth outer edge 122. In this case, the area of the existing design space actually occupied by the two is the same, that is, both are within the rectangular area defined by the maximum length and the maximum width, but the former has a larger available space for coil arrangement than the latter, so that a larger braking force and a better braking effect can also be provided.

Figure 6:
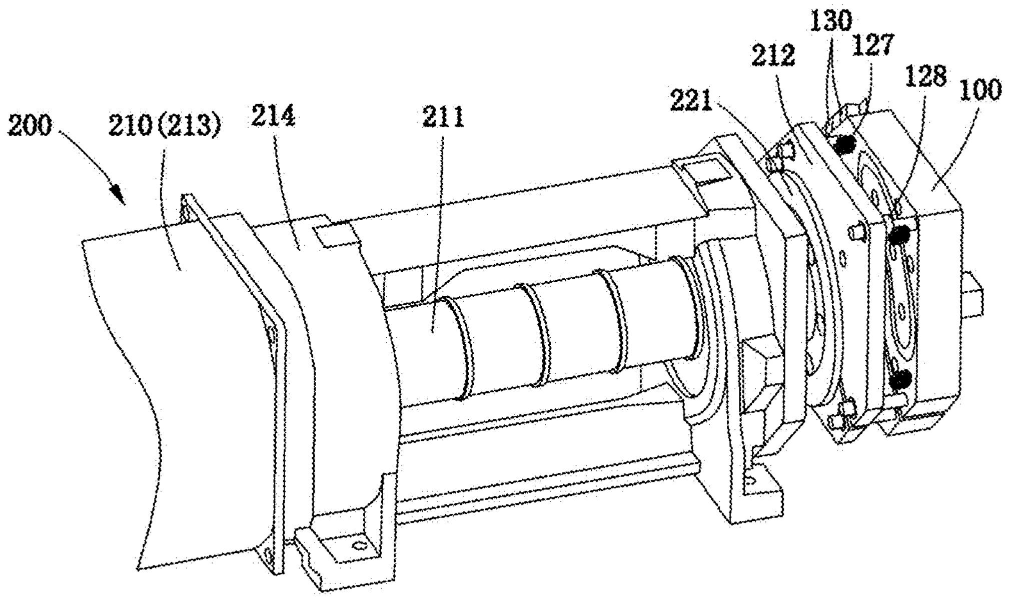
FIG. 6 is a schematic perspective view of one embodiment of a brake for an elevator system.
Figure 7:
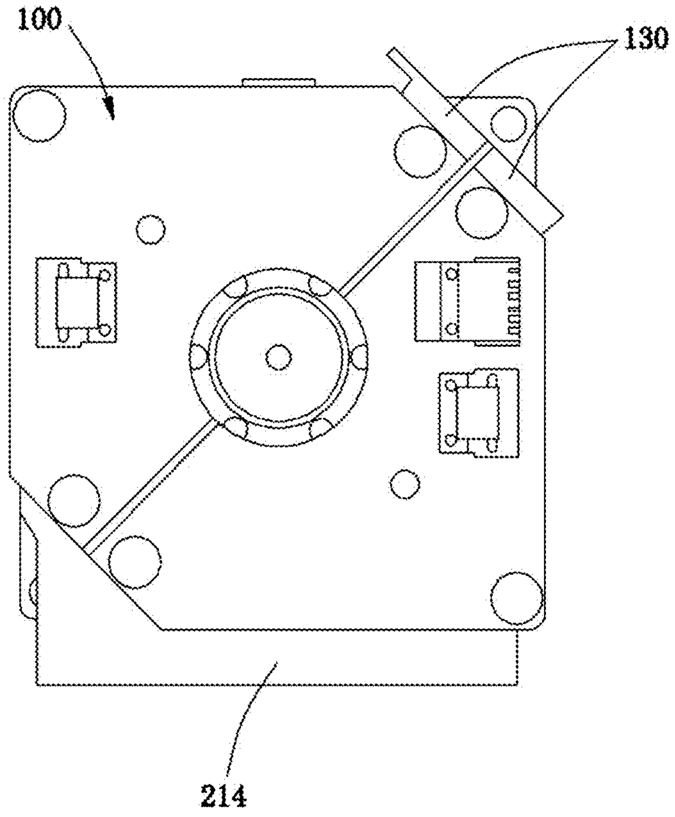
FIG. 7 is a schematic side view of one embodiment of a brake for an elevator system.

As still another example, continuing with the first static plate as an example, the location and included angle relationship between the first outer edge 111, the second outer edge 112, and the first inner edge 113 of the first static plate are described in the foregoing embodiments. However, it is not emphasized whether the first inner edge 113 and the aforesaid outer edge must be in a connecting relationship, and in the case of no direct connection, the aforesaid included angle relationship may also be achieved by the included angle at the intersection of the linear extension lines of these edges. At this point, other edges for connecting the outer edge and the inner edge may also be provided between the two for other purpose. As shown in FIG. 1, the first static plate of the brake static plate assembly 100 further includes a first mounting edge 116 connected between the first inner edge 113 and the first outer edge 111, and the second static plate correspondingly includes a second mounting edge 126 connected between the second inner edge 123 and the fourth outer edge 122. In the installed state, the two remain flush to facilitate installation here for the brake switch 130 (as shown in FIGS. 6 and 7). The brake switch may be used to control the on-off of power supply of one or both of the first set of coils 114 and the second set of coils 124, thereby effecting a brake operation or release operation of the brake. The brake switch in such an arrangement would be located within the rectangular space defined by the largest edge dimensions of the first and second static plates 110, 120. Therefore, on one hand, no extra design space is occupied; on the other hand, compared with an original design mode that the brake switch is arranged on the back of the static plate in the axial direction, the current arrangement can effectively save the axial design space of the brake static plate assembly.

In addition, in order to achieve cooperation between the braking part of the brake and the brake static plate assembly, several auxiliary parts can be provided on the static plate. For example, with continued reference to FIG. 1, a reset part 117 may be disposed on the braking surface 115 of the first static plate 110 and a reset part 127 may be disposed on the braking surface 125 of the second static plate 120, to provide a reset force for the brake operation of the braking part 220 of the brake 200. Accordingly, the first set of coils 114 of the first static plate 110 and the second set of coils 124 of the second static plate 120 provide an electromagnetic force for the release operation of the braking part 220 of the brake 200. That is, when the power is on, the electromagnetic force generated by the first set of coils 114 and the second set of coils 124 attracts the braking part 220 of the brake 200, making the braking part 220 oppose the reset force provided by the reset part 127, and the object to be braked is released; and when the power is off, the electromagnetic force no longer generated by the first set of coils 114 and the second set of coils 124, and the braking part 220 of the attracted brake 200 returns to the original position and abuts against the object to be braked under the action of the reset force provided by the reset part 127, thereby braking the object to be braked. In fact, the above description exists by way of example only, and the force application action of the both may also be inverted entirely, as long as the electromagnetic force and the reset force have opposite force application directions. The presence of the reset part allows the braking part 220 to have a smoother reset process.

On this basis, in order to provide sufficient arrangement space for the coil to improve its magnetic flux, the reset parts 117 and 127 may be disposed close to the edges of the first and second static plates 110 and 120. In particular, the reset part 117 can be arranged at the included angle between the first outer edge 111 and the second outer edge 112, or the reset part 117 can be arranged separately or simultaneously at the included angle between the first inner edge 113 and the first outer edge 111 and of the first inner edge 113 and the second outer edge 112.

Optionally, a guide part 118 may also be disposed on the braking surface 115 of the first static plate 110 and a guide part 128 may be disposed on the braking surface 125 of the second static plate 120 for guiding the brake operation of the braking part 220 of the brake 200 to move away from the brake static plate assembly 100 and the release operation of the braking part 220 of the brake 200 to move towards the brake static plate assembly 100. That is, the braking part 220 of the brake 200 can be made to perform the brake operation and the release operation in a predetermined direction, thereby improving the reliability of braking and releasing of the braking, and reducing the problem of unbalance loading.

On this basis, in order to provide sufficient arrangement space for the coil to improve its magnetic flux, the guide parts 118 and 128 may be disposed close to the edges of the first and second static plates 110 and 120. In particular, the guide part 118 can be arranged at the included angle between the first outer edge 111 and the second outer edge 112, and the reset part 117 can also be separately or simultaneously arranged at the included angle between the first inner edge 113 and the first outer edge 111 and of the first inner edge 113 and the second outer edge 112.

Figure 4:
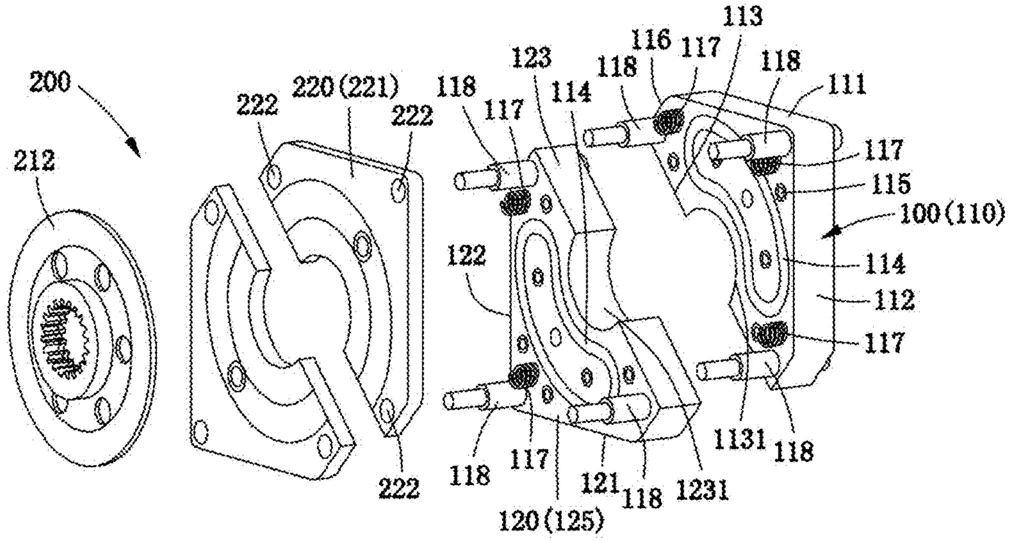
FIG. 4 is a schematic view of one embodiment of a brake for an elevator system in which a portion of the components and parts are shown in an unassembled state.
Figure 5:
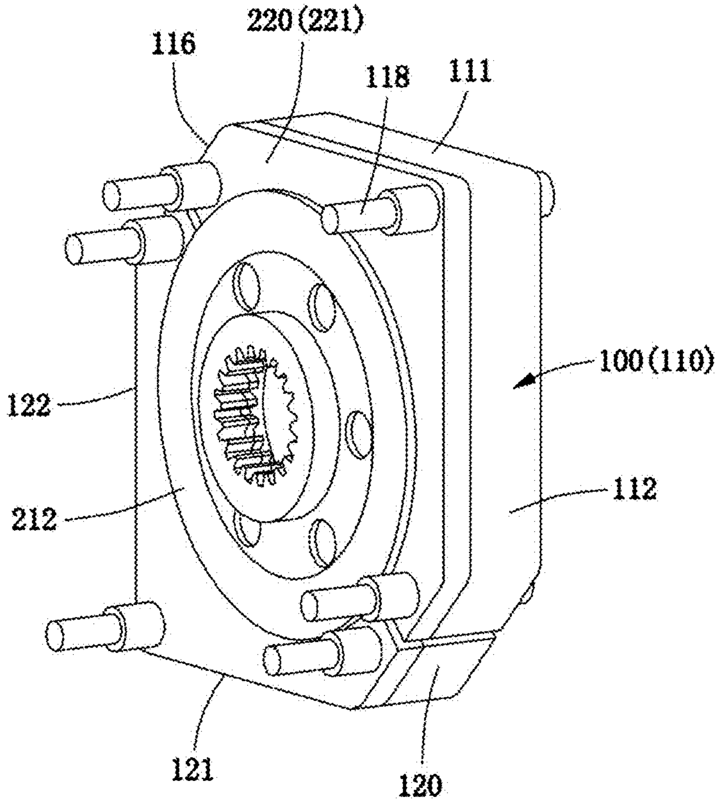
FIG. 5 is a schematic diagram of one embodiment of a brake for an elevator system in which a portion of the components and parts are shown in an assembled state.

Further, referring to the example illustrated in FIGS. 1 and 4, the reset part may be configured in the specific structural form of a reset spring, and the guide part may be configured in the specific structural form of a guide post. On this basis, although not shown in the figures, the two may also be nested for the purpose of further saving design space to avoid the coil arrangement, i.e. guide posts 118, 128 and reset springs 117, 127 arranged around the guide posts 118, 128 are provided on the braking surfaces of the first and second static plates 110, 120, respectively. With such an arrangement, the reset force provided by the reset springs 117, 127 will serve to guide the brake operation of the braking part 220 of the brake 200 to move along the guide posts 118, 128 and away from the brake static plate assembly 100 and the release operation of the braking part 220 of the brake 200 to move towards the brake static plate assembly 100. Accordingly, the electromagnetic force provided by the first set of coils 114 of the first static plate 110 and the second set of coils 124 of the second static plate 120 will serve to guide the brake operation of the braking part 220 of the brake 200 to move along the guide posts 118, 128 and away from the brake static plate assembly 100 and the release operation of the braking part 220 of the brake 200 to move toward the brake static plate assembly 100. Similar to the operating principle and implementing form of the embodiments described above, the aforementioned electromagnetic force and reset force, respectively, can be used to achieve either of the two operations, as long as the two have opposite force application directions.

Turning to FIGS. 1-3, the coils described herein can be arranged in a variety of structural forms, and the most important consideration in the design process is that: the maximum magnetic flux is achieved with the least amount of winding; and the structure of coils can be matched with structure of the static plate and does not interfere with other parts on the static plate. Based on the foregoing considerations, the first set of coils 114 or the second set of coils 124 may be configured separately as a single arc-shaped coil (as shown in FIG. 1) or racetrack-shaped coil, or configured as multiple arc-shaped coils, racetrack-shaped coils (as shown in FIG. 2), or circular-shaped coils (as shown in FIG. 3).

One embodiment of the brake is described herein with continued reference to FIGS. 4-7. The brake comprises the brake static plate assembly in any of the embodiments or combinations thereof, and therefore has various effects brought by the brake static plate assembly, which is not described in detail herein. The matching relationship between other components and parts of the brake and the brake static plate assembly is emphasized as follows. In particular, the brake 200 also generally includes a braking part 220 that can be driven to move toward the brake static plate assembly 100 to perform a release operation or driven to move away from the brake static plate assembly 100 to perform a brake operation, thereby achieving a respective function of braking or releasing of braking.

Further, although not shown, an embodiment of an elevator system is also provided herein. The elevator system includes the brake of any of the preceding embodiments or combinations thereof. In addition, it also comprises a motor assembly 210 having a transmission part 212 associated to a drive shaft 211. Under the control of the elevator system, the braking part of the brake is driven to move towards the brake static plate assembly to perform a release operation or towards the transmission part 212 to perform a brake operation, and thus has various effects brought by the brake, which are not described in detail herein.

In connection with an elevator system and brake, the construction of various components altered for adapting to the brake static plate assembly or adapter, and the connection relationships thereof, will be described as follows. In addition, some components and parts may be further added, as also exemplarily described below, for the purpose of improving the reliability, utility, economy, or improvements in other aspects.

For example, the motor assembly 210 of the elevator system includes: a base 214; a drive shaft 211 pivotally connected within the base 214; a drive motor 213 positioned on a first side outside the base 214 and coupled to the drive shaft 211; and a brake lining disc 212 positioned on a second side outside the base 214 and coupled to the drive shaft 211 as a transmission part 212. While the braking part 220 is configured as an armature 221 having a guide bushing 222 disposed through its main body, and the armature 221 is guided to perform the brake operation and release operation for brake lining disc 212 through the fitting of the guide bushing 222 with the guide posts 118, 128 on the first and second static plates 110, 120 of the brake static plate assembly 100.

Specifically, when the brake static plate assembly 100 is energized, the first set of coils 114 and the second set of coils 124 located on the first static plate 110 and the second static plate 120 are energized, which attract the armature 221 to move along the guide bushing 222 towards the braking surfaces 115, 125 of the static plates against the reset force of the reset spring 127. At this time, the brake lining disc 212 coupled to the drive shaft 211 (e.g., via a splined connection) is not subjected to braking pressure and can rotate as the drive shaft 211 rotates.

Again, when the brake static plate assembly 100 is de-energized, the first set of coils 114 and the second set of coils 124 located on the first static plate 110 and the second static plate 120 are de-energized and no longer attract the armature 221, whereby the reset spring 127 is no longer impeded and the reset force exerted by the reset spring 127 urges the armature 221 to move along the guide bushing 222 towards the brake lining disc 212 on the side of the motor assembly 210. At this time, the brake lining disc 212 coupled to the drive shaft 211 (e.g., via a splined connection) is subjected to braking pressure, and in turn, the drive shaft 211 can be braked, thereby avoiding potential safety hazards.

It should also be noted that the brake static plate assembly, the motor assembly, the braking part of the brake and other parts of the elevator system provided according to the present application can be designed, manufactured and sold separately, or they can be assembled together and then sold as a whole. They all fall within the scope of protection of the present application, whether in the form of the monomers formed before the assembling, or the whole formed after the assembling.

The above examples mainly illustrate the brake static plate assembly, the brake and the elevator system of the present application. Although only some of the embodiments of the present application have been described, those of ordinary skill in the art will appreciate that the present disclosure may be implemented in many other forms without departing from the spirit and scope thereof. Accordingly, the illustrated examples and embodiments are to be regarded in an illustrative rather than a restrictive sense, and various modifications and alternatives may be covered by the present application without departing from the spirit and scope of the present application, as defined by the appended claims.

What is claimed is:

1. A brake static plate assembly, characterized in that, comprising:

a first static plate, which has:

a first outer edge and a second outer edge which are adjacent to each other;

a first inner edge provided with a first shaft mounting notch thereon; and a first set of coils disposed on a braking surface of the first static plate;

a second static plate, which has:

a third outer edge and a fourth outer edge which are adjacent to each other;

a second inner edge which is matched with the first inner edge and is provided with a second shaft mounting notch which forms a shaft mounting hole of a drive shaft together with the first shaft mounting notch; and a second set of coils disposed on the braking surface of the second static plate, and a magnetic flux of the second set of coils is the same as that of the first set of coils;

wherein the first inner edge forms an acute angle with the first outer edge and/or the second outer edge, and the second inner edge forms an acute angle with the third outer edge and/or the fourth outer edge.

2. The brake static plate assembly according to claim 1, characterized in that, the first outer edge and the second outer edge are perpendicular to each other, the first inner edge forms an angle of 45° with the first outer edge and the second outer edge respectively; the third outer edge and the fourth outer edge are perpendicular to each other, and the second inner edge forms an angle of 45° with the third outer edge and the fourth outer edge respectively.

3. The brake static plate assembly according to claim 2, characterized in that, an area of the braking surfaces of the first static plate and the second static plate is greater than the area of the largest circle formed in a boundary defined by the first outer edge, the second outer edge, the third outer edge and the fourth outer edge.

4. The brake static plate assembly according to claim 2, characterized in that, the first static plate is disposed symmetrically to the second static plate.

5. The brake static plate assembly according to claim 2, characterized in that, further comprising a first mounting edge and a second mounting edge, the first mounting edge is connected between the first inner edge and the first outer edge and/or second outer edge, the second mounting edge is connected between the second inner edge and the third outer edge and/or fourth outer edge; wherein a brake switch used for controlling on-off of the power supply of the first set of coils and/or the second set of coils is disposed in a plane where the first static plate and the second static plate are located along the first mounting edge and the second mounting edge.

6. The brake static plate assembly according to claim 1, characterized in that:

a reset part is further disposed on the braking surface of the first static plate and/or the braking surface of the second static plate and used for providing reset force for brake operation or release operation of a braking part of the brake;

the first set of coils of the first static plate and the second set of coils of the second static plate provide electromagnetic force for release operation or brake operation of a braking part of the brake; wherein the electromagnetic force and the reset force have opposite force application directions.

7. The brake static plate assembly according to claim 6, characterized in that, the reset part is provided close to the edge of the first static plate and/or the edge of the second static plate.

8. The brake static plate assembly according to claim 7, characterized in that, the reset part are arranged at an included angle between the first outer edge and the second outer edge and/or the reset part are arranged at the included angle between the first inner edge and the first outer edge and the included angle between the first inner edge and second outer edge.

9. The brake static plate assembly according to claim 1, characterized in that, a guide part is further provided on the braking surface of the first static plate and/or the braking surface of the second static plate, and the guide part used for the brake operation of guiding the braking part of the brake to move away from the brake static plate assembly and/or the release operation of guiding the braking part of the brake to move towards the brake static plate assembly.

10. The brake static plate assembly according to claim 9, characterized in that, the guide part is disposed close to the edge of the first static plate and/or the edge of the second static plate.

11. The brake static plate assembly according to claim 10, characterized in that, the guide part is arranged at an included angle between the first outer edge and the second outer edge and/or the reset part is arranged at the included angle between the first inner edge and the first outer edge and the included angle between the first inner edge and the second outer edge.

12. A brake static plate assembly according to claim 1, characterized in that:

a guide post and a reset spring surrounding the guide post are further disposed on the braking surface of the first static plate and/or the braking surface of the second static plate;

wherein the reset force provided by the reset spring is used for the brake operation of guiding the braking part of the brake to move along the guide post and away from the brake static plate assembly and/or the release operation of guiding the braking part of the brake to move towards the brake static plate assembly; and the electromagnetic force provided by the first set of coils of the first static plate and the second set of coils of the second static plate is used for the brake operation of guiding the braking part of the brake to move along the guide post and away from the brake static plate assembly and/or the release operation of guiding the braking part of the brake to move towards the brake static plate assembly; wherein the electromagnetic force and the reset force have opposite force application directions.

13. A brake static plate assembly according to claim 1, characterized in that:

the first set of coils is configured as one arc-shaped coil or racetrack-shaped coil, or as a plurality of arc-shaped coils, racetrack-shaped coils, or circular coils; or the second set of coils is configured as one arc-shaped coil or racetrack-shaped coil, or as a plurality of arc-shaped coils, racetrack-shaped coils, or circular coils.

14. A brake, characterized in that, comprising:

the brake static plate assembly according to claim 1; and a braking part, which is driven to move towards the brake static plate assembly to perform the release operation or move away from the brake static plate assembly to perform the brake operation.

15. The brake according to claim 14, characterized in that, further comprising a transmission part, which comprises a brake lining disc fixedly connected to the drive shaft.

16. The brake according to claim 14, characterized in that, when the brake static plate assembly includes a guide post, the braking part further includes a guide bushing disposed through its main body for fitting with the guide post of the brake static plate assembly.

17. An elevator system, characterized in that, comprising:

the brake according to claim 14; and a motor assembly, which has a transmission part associated to a drive shaft;

wherein a braking part of the brake is driven to move towards the brake static plate assembly to perform a release operation or move towards the transmission part to perform a brake operation.

* * * * *